United States Patent [19]

Ray

[11] 4,367,211

[45] Jan. 4, 1983

[54] PLASMA ARC PROCESS FOR THE REDUCTION OF SULFUR DIOXIDE TO SULFUR

[75] Inventor: William G. Ray, Mountain Lakes, N.J.

[73] Assignee: Pfizer Inc., New York, N.Y.

[21] Appl. No.: 344,858

[22] Filed: Feb. 1, 1982

[51] Int. Cl.³ ............................................. C01B 17/04
[52] U.S. Cl. .................................. 423/569; 204/164; 204/174
[58] Field of Search ................. 423/569; 204/164, 174

[56] References Cited

U.S. PATENT DOCUMENTS

| | | | |
|---|---|---|---|
| 4,147,762 | 4/1979 | Steiner | 423/569 |
| 4,190,636 | 2/1980 | Schmerling et al. | 423/415 A |
| 4,207,292 | 6/1980 | Bischoff et al. | 422/232 |

FOREIGN PATENT DOCUMENTS 56-59604  5/1981  Japan .
1552886  9/1979  United Kingdom .

OTHER PUBLICATIONS

Considine, D.M., *Chemical and Process Technology Encyclopedia*, 1974, p. 880.

*Primary Examiner*—G. Peters
*Attorney, Agent, or Firm*—Charles J. Knuth; Peter C. Richardson; Harold W. Ordway

[57] ABSTRACT

A continuous process for the reduction of sulfur dioxide to sulfur in which a gas stream containing sulfur dioxide is contacted with a carbon source in the form of particulate coal at a temperature of at least 600° C. in a plasma arc reaction zone generated by a rotating direct current arc.

6 Claims, 2 Drawing Figures

PLASMA ARC PROCESS FOR THE REDUCTION OF SULFUR DIOXIDE TO SULFUR

BACKGROUND OF THE INVENTION

This invention concerns a novel process for the conversion of sulfur dioxide to elemental sulfur.

Sulfur dioxide is found in the vent gases from industrial plants involved in the roasting, smelting and sintering of sulfide ores as well as those from power and industrial plants which burn sulfur-bearing fuels such as coal and oil. The desire to prevent both environmental air pollution and the loss of significant sulfur values has resulted in considerable effort to remove the sulfur dioxide from these vent gases. Since elemental sulfur represents a stable and easily transportable form, much of this effort has been directed to the reduction of sulfur dioxide to sulfur, either directly from the vent gases or indirectly from regenerative sulfur dioxide absorption systems.

Attempts at the reduction of sulfur dioxide to sulfur have included numerous approaches. The reduction can be accomplished by the Claus reaction, but this approach requires the handling and transport of toxic and flammable hydrogen sulfide. Alternatively, a thermal or catalytic reduction with a reducing gas such as hydrogen, carbon monoxide or a low molecular weight hydrocarbon may be employed, but such reducing agents are relatively costly.

A more recent approach to the reduction has therefore been with the use of the relatively abundant and inexpensive hydrocarbon coal. Such a reduction is the so-called Resox process disclosed, for example, in U.S. Pat. Nos. 4,147,762 and 4,207,292 and in which a stream containing sulfur dioxide is contacted with a moving bed of particulate coal at a temperature of from 1150° to 1550° F. (621°to 843° C.) in the presence of steam. While this process is relatively inexpensive and nonpolluting, it does possess certain disadvantages, which include the tendency of the coal particles to agglomerate at the reaction temperatures employed; the inherent large excess of coal in the reaction zone with resultant low effective utilization of the coal and potential contamination of the product sulfur with coal impurities such as tars; and the formation of by-product hydrogen sulfide and carbonyl sulfide.

Attempts to overcome such drawbacks are disclosed in British Patent Specification No. 1,552,886, in which a fluidized bed comprised of coal and a solid diluent is used to minimize bed agglomeration, and in Japanese Patent Application Disclosure 59604/81, in which a second reactor is employed to convert the hydrogen sulfide and carbonyl sulfide in the exit stream of the primary reactor to sulfur by low temperature reaction with a portion of the original sulfur dioxide laden stream and thereby improve the coal utilization.

It is the primary objective of the present invention to provide an alternative and simple process for the conversion of sulfur dioxide to elemental sulfur using coal as the reductant which results in a minimum formation of hydrogen sulfide and carbonyl sulfide and a maximum utilization of the coal.

Plasma arc methods have been employed for effecting various chemical reactions at high temperature. Such reactions include the conversion of carbon dioxide to carbon monoxide with carbon as disclosed in U.S. Pat. No. 4,190,636 and the reaction of coal with hydrogen to form acetylene and of carbon with nitrogen to form, cyanogen mentioned by D. M. Considine in *Chemical and Process Technology Encyclopedia, b 1974*, page 880. The reduction of sulfur dioxide, however, has not been suggested.

SUMMARY OF THE INVENTION

It has now been found that sulfur dioxide can be readily and efficiently reduced to sulfur by reaction with carbon in a plasma arc reaction zone. The present invention therefore entails a continuous process for the reduction of sulfur dioxide to sulfur which comprises contacting a gas stream containing sulfur dioxide with a carbon source in a plasma arc reaction zone at a temperature of at least about 600° C.

The carbon source for this process is preferably concurrently introduced with the sulfur dioxide into the zone in the form of particulate coal, particularly where the molar ratio of the sulfur dioxide to the carbon content of the coal is from about 0.5 to 2, and especially where the ratio is about 1.0. The process is particularly applicable to gas streams wherein the concentration of the sulfur dioxide in the stream is at least about 5 volume percent, and the reaction zone is preferably generated by a rotating direct current arc.

BRIEF DESCRIPTION OF THE DRAWINGS

The above and other objects, features and advantages of the present invention will be apparent from the following detailed description of embodiments thereof in conjunction with the accompanying drawings wherein like reference numerals indicate like structures throughout the drawings.

DETAILED DESCRIPTION OF THE INVENTION

Figure 1:
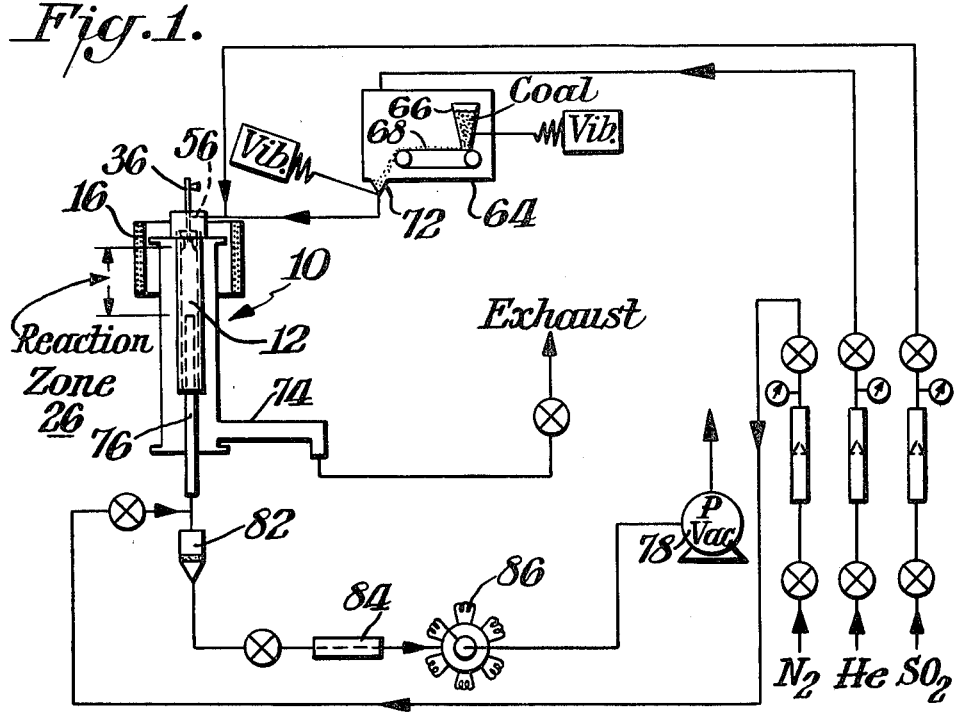
FIG. 1 is a schematic drawing of a rotating direct current arc reactor system particularly suited for use in the process of the present invention.

The process of the present invention utilizing an arc-generated high temperature plasma for the conversion of sulfur dioxide to sulfur with a carbon source offers a distinct advantage over the prior art Resox processes, since momentary rather than prolonged contact of the reactants occurs and carbon rather than hydrogen is the effective reductant. This results in a much higher utilization of the carbon source and less tendency to form by-product hydrogen sulfide and carbonyl sulfide.

The technique for generating a high temperature plasma by means of an electric arc is well known, and such electric arc gas heaters are discussed by R. F. Baddour and R. S. Timmins of pages 13-25 of *The Application of Plasmas to Chemical Processing*, the M.I.T. Press, 1967, incorporated herein by reference. All electric arc gas heaters consist of an anode, cathode and arc discharge. In these heaters, the transfer of electricity into thermal and kinetic energy of the gas flow is accomplished by joule heating and/or magnetoplasmadynamic (MPD) energy-addition processes, the joule-heating arc heater being further classified into one of three categories depending upon the method of stabilization of the arc discharge: magnetic stabilization, aerodynamic stabilization and wall stabilization. While any such electric arc gas heater may be used to provide the plasma arc reaction zone for the present process, a zone generated by a rotating direct current arc produced in a joule-heating arc heater employing magnetic stabilization is preferred.

The present process can be conducted in any portion of a reaction zone created by an electric arc gas heater which is at a temperature of about 600° C. or higher. Such electric arcs often produce temperatures of 3000°–8000° or higher, affording virtually instantaneous reaction of the feed components. The reduction of the instant process is exothermic, and therefore the energy input to the arc reactor is primarily to generate the plasma arc and to heat the reactants to the reaction temperature. The energy of the plasma arc and that released by the reaction may be recovered in an appropriate heat exchanger to preheat the reactants and produce process steam; in this manner, a substantial reduction in the electrical energy input can be realized.

The process of the present invention can be applied to a wide variety of sulfur dioxide-containing gas streams, including those in which the sulfur dioxide concentration is as low as about 100 parts per million or less as well as those which are essentially pure sulfur dioxide. Illustrative of streams containing the lower concentrations are such gases as utility flue gases, such as those resulting from the burning of fossil fuel such as coal and oil, in which the sulfur dioxide content of the gas may range from about 100 to 5000 parts per million; industrial flue gases, such as the Claus tail gases and the gases from sulfuric acid plants, which typically have sulfur dioxide contents of from about 2 to 4 volume percent; and smelter gases from the roasting of nonferrous ores, in which the sulfur dioxide content may be as high as 20 volume percent or more. The higher concentrations of up to essentially pure sulfur dioxide are found primarily in gas streams evolved during the regeneration cycle of regenerative sulfur dioxide absorption processes. Since the use of gas streams containing low concentrations of sulfur dioxide will not be as efficient as those of higher concentration, the present process preferably uses gas streams containing at least about 5 volume percent sulfur dioxide, more preferably at least 50 percent and most preferably above 80 percent. The diluent in these gas streams is normally comprised of gases inert to the process, such as nitrogen and carbon dioxide, but minor amounts of reducing gases such as carbon monoxide and hydrogen as well as water vapor may be present. Oxidizing gases such as oxygen are kept to a minimum since they compete with the sulfur dioxide for the reductant. The gas stream may optionally be scrubbed prior to the reaction to remove particulates and strongly acidic gaseous components such as hydrogen chloride and sulfur trioxide.

The reduction of the sulfur dioxide is accomplished by the continuous contact of the sulfur dioxide-containing gas stream with a carbon source in the reaction zone of the plasma arc heater. By carbon source is meant a material comprising essentially elemental carbon or a form of carbon in which the elemental carbon acts as the reducing agent in the reaction. Such materials include the graphites and coals.

The carbon source, particularly in the case of graphite, may be in the form of a consumable electrode of the electric arc heater. Preferably, however, the carbon source, particularly when it is coal, is concurrently introduced to the reaction zone in particulate form. By particulate coal is meant a coal such as crushed coal having a maximum particle size of about 5 millimeters, and more commonly less than about 500 microns. Preferably, the coal has a weight average particle size of from about 40 to 250 microns. Both agglomerating and nonagglomerating coals, including lignite, subbituminous, bituminous and anthracite coals may be used, clacination or other pretreatment of the coal to prevent agglomeration being unnecessary. The coal should be essentially dry, however, preferably with a moisture content of less than about 10 weight percent.

Since the carbon, hydrogen and oxygen contents of coals will vary, the effective carbon content, or carbon equivalent, of the coal will be the net reducing value of the coal, expressed as carbon. The molar ratio of the sulfur dioxide to the carbon equivalent of the coal in the reaction zone will normally be from about 0.5 to 2.0, the lower ratio producing maximum reduction of the sulfur dioxide and the higher ratio resulting in a minimum utilization of the coal. A ratio at about the stoichiometric ratio of 1.0 produces an optimum balance of these utilizations with a minimum formation of by-product hydrogen sulfide and carbonyl sulfide.

Rotating Direct Current Electric Arc Reactor

Figure 2:
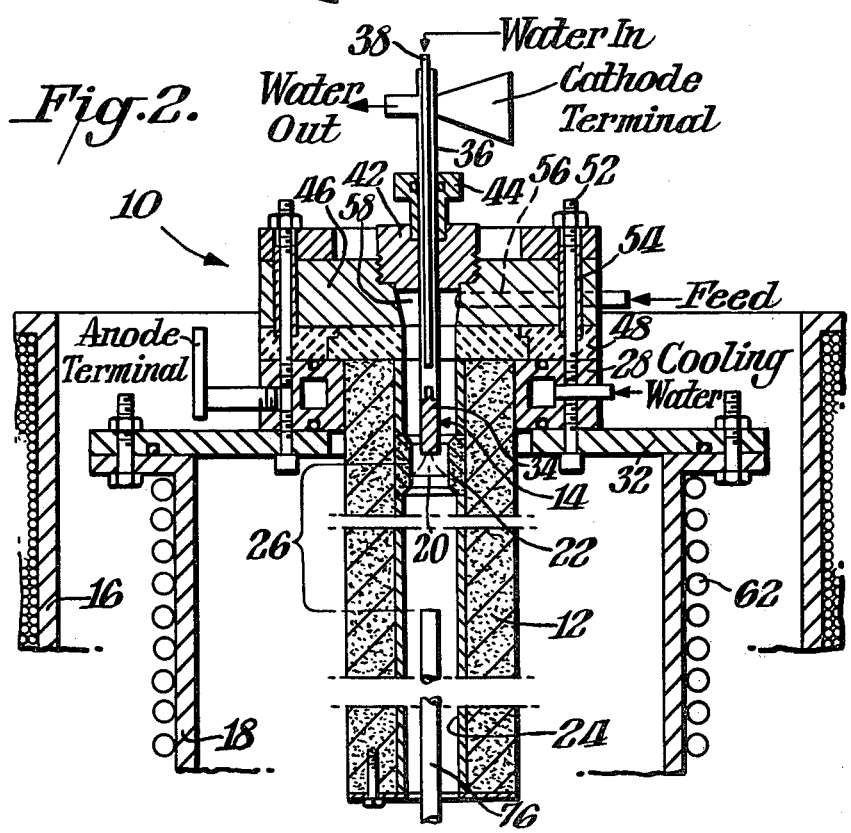
FIG. 2 is a cross-sectional view in elevation of a portion of the head assembly of the reactor of FIG. 1.

The present process was evaluated in an experimental rotating direct current electric arc reactor 10, shown in FIGS. 1 and 2, having a minimum power input of 40 kilowatts. The arc was produced between a cylindrical anode 12 and a cathode rod 14 positioned at the axis of anode 12 to provide a gap space of 0.125 inch. The arc was rotated by an axial magnetic field produced by a solenoid 16 placed concentrically around the shell of reactor 10 which served as a cooling chamber 18, the arc rotation forming a conical high temperature zone 20 through which the reactants pass.

Anode 12 of reactor 10 comprised a 17 inch long cylindrical shell of graphite having an outside diameter of 2.5 inches and an inside diameter of 1 inch. The inside diameter of anode 12 was narrowed to 0.75 inch for a 1 inch length starting at two inches from the top to act as a holder for a replaceable anode insert 22. The lower part of anode 12 below anode insert 22, known as the anode nozzle 24, served to insulate the high enthalpy reaction zone 26 immediately below anode insert 22 from the cold ambient gas of cooling chamber 18.

Anode insert 22 consisted of a 1 inch long cylindrical ring of 25/75 copper/tungsten alloy having an outside diameter of 1 inch and an inside diameter of 0.5 inch tapered 45° at the top and near the bottom to streamline the gas flow. The inside surface of anode 12 immediately above and below anode insert 22 was provided with boron nitride inserts, and anode nozzle 24 was lined with stainless steel, to prevent consumption of anode 12 during operation.

The upper end of anode 12 was screwed into a water-cooled, brass anode holder 28, 1 inch long with a 5 inch outside diameter and 2.5 inch inside diameter, which in turn was mounted centrally above an annular 0.25 inch thick stainless steel plate 32 of 10 inches outside diameter and 3 inches inside diameter, plate 32 serving as the top cover of cooling chamber 18.

Cathode 14 comprised a 0.25 inch diameter tungsten rod tip 34 welded to the bottom of a 5 inch long stainless steel tube 36 of the same diameter, tube 36 having a 0.125 inch outside diameter stainless steel tube 38 mounted concentrically within it to provide water cooling. Cathode 14 was inserted into reactor 10 through a 0.25 inch diameter hole in the center of a 2 inch deep by 2 inch diameter stainless steel feeding-ring cap 42 provided with an O-ring seal 44, the tungsten tip 34 of cathode 14 aligning vertically with the upper rim of copper/tungsten anode insert 22. Feeding-ring cap 42 in turn was threaded on its lower external portion to screw axially halfway into the upper portion of a 5 inch outside diameter by 1 inch high stainless steel feed plate 46 resting on anode holder 28, feed plate 46 and anode holder 28 being electrically insulated by a 0.5 inch thick insulator ring 48 consisting of a 3 inch outside diameter by 0.75 inch inside diameter boron nitride ring fitted inside a 5 inch outside diameter by 3 inch inside diameter Micarta$^R$ ring. Feed plate 46 and insulator ring 48 were fastened to anode holder 28 by six bolts 52 electrically insulated by ceramic bushings 54.

The feedline 56 to reactor 10 was provided by a 0.25 inch hole bored horizontally through feed plate 46, entering the feeding ring 58 tangentially in a counter-clockwise direction to provide a swirling action in arc reaction zone 26 for better mixing of the reactants.

The reactor shell forming cooling chamber 18 for the quenching of the high enthalpy jet emerging from reaction zone 26 within anode nozzle 24 consisted of a carbon steel pipe 7 inches in internal diameter and 24 inches long wrapped with copper cooling coils 62 soldered to its outside surface. Rotating arc zone 20 was established by an axial magnetic field provided by solenoid 16 placed concentrically outside the reactor 10 shell near the arc-head assembly, providing a magnetic flux of about 110 gauss at the reactor 10 axis.

The reactants were fed to reactor 10 through feedline 56 in feed plate 46. Powdered coal was fed at a controlled rate from a sealed powder feeder box 64 comprising a vibrated powder hopper 66, a controlled speed conveyor belt 68 and a vibrated chute 72 connected to feedline 56, the coal dropping from hopper 66 onto belt conveyor 68 to chute 72, where it was carried to feedline 56 by the flow of metered helium gas entering the top of feeder box 64. Sulfur dioxide gas was metered to reactor 10, combining with the coal just before feedline 56. The reactants passed through reaction zone 26 and the product stream was exhausted at a port 74 in the bottom portion of cooling chamber 18.

The bottom of cooling chamber 18 contained an axially located sample probe 76 consisting of a 0.25 inch outside diameter water-jacketed copper tube extending 15 inches into cooling chamber 18 and connected to a vacuum pump 78. Except during actual sampling, probe 76 was continuously purged with nitrogen to prevent plugging and to ensure the collection of a representative sample. During the sampling, the reaction gas stream was drawn by vacuum pump 78 into probe 76 through a particulate filter 82 and a desiccant 84, and collected in a sample valve 86 capable of isolating 16 individual 1 cc samples. Each collected sample was analyzed by gas chromatography for hydrogen, hydrogen sulfide ($H_2S$), carbonyl sulfide (COS), carbon dioxide ($CO_2$), carbon monoxide (CO), argon, nitrogen and oxygen using Porapak$^R$ Q columns and a thermal conductivity detector.

The following examples are merely illustrative and are not to be construed as limiting the invention, the scope of which is defined by the appended claims.

EXAMPLE 1

The experimental rotating direct current electric arc reactor was employed as described to reduce a stream of sulfur dioxide with an air-dried −60 mesh (250 micron) washed powdered bituminous coal. The sulfur dioxide had a moisture content of 2.1 weight percent, while the coal had an ultimate analysis of 4.9 weight percent hydrogen, 61.0% carbon, 1.0% nitrogen, 9.9% oxygen (by difference), 5.9% sulfur and 16.6% ash; correcting for the reducing potential of the hydrogen content ($4.9 \times 12.01/4 \times 1.008$ or 14.7% carbon equivalent) and oxidizing potential of the oxygen content ($9.9 \times 12.01/16 \times 2$ or 3.7% carbon equivalent), the carbon equivalent of the coal was 72.0 weight percent.

The sulfur dioxide, diluted slightly with tracer argon, was combined with the coal suspended in a stream of helium, and the combined stream was continuously fed through the reactor operating at an arc voltage of 75 volts and an arc current of 125 amps (6.21 kilowatts/gm coal), the following rates being employed:

| Material | Rate cc or (gm)/min | moles/min |
|---|---|---|
| sulfur dioxide | 1870 | 0.077 |
| water | (0.031) | 0.0017 |
| coal | (1.51) | 0.091[1] |
| argon | 219 | 0.0091 |
| helium | 12500 | 0.518 |

[1] carbon equivalent (assayed carbon 0.077 mole/min)

Analysis of the exit stream at equilibrium indicated a sulfur dioxide conversion, expressed as (moles $SO_2$ fed-moles $SO_2$ exit stream)/moles $SO_2$ fed, of 69.8%; a carbon conversion, expressed as moles ($CO+CO_2+COS$) formed/moles assayed carbon fed, of 80.4%; and a sulfur yield, expressed as (moles $SO_2$ reacted-moles ($COS+H_2S$) formed)/moles $SO_2$fed$\times SO_2$ conversion, of 94.5% (carbonyl sulfide 2.6%, hydrogen sulfide 2.9%).

EXAMPLES 2–4

The conversion of Example 1 was repeated at other molar ratios of sulfur dioxide to carbon equivalent by holding the coal, argon and helium feed rates constant as in Example 1 and varying the sulfur dioxide feed rate. Results of the conversions are as indicated below:

| Example | 2 | 3 | 4 |
|---|---|---|---|
| Molar ratio, $SO_2/C$ | | | |
| Carbon equivalent | 0.43 | 1.29 | 1.72 |
| Assayed carbon | 0.51 | 1.52 | 2.02 |
| $SO_2$ cc/min | 940 | 2820 | 3760 |
| moles/min | 0.039 | 0.117 | 0.156 |
| $H_2O$ cc/min | 0.015 | 0.046 | 0.061 |
| moles/min | 0.009 | 0.0026 | 0.0034 |
| Arc reactor | | | |
| Volts | 53 | 65 | 85 |
| Amps | 167 | 150 | 100 |
| Kw/gm coal | 5.9 | 6.5 | 5.6 |
| Conversion, % | | | |
| $SO_2$ | 91.5 | 81.3 | 59.6 |
| Carbon | 41.5 | 55.0 | 72.9 |
| Sulfur loss, % | | | |
| COS | 2.4 | 1.6 | 1.3 |
| $H_2S$ | 0.1 | 2.6 | 0.4 |
| total | 2.5 | 4.2 | 1.7 |
| Sulfur yield, % | 97.5 | 95.8 | 98.3 |

I claim:

1. A continuous process for the reduction of sulfur dioxide to sulfur, which comprises contacting a gas stream containing sulfur dioxide with a carbon source in a plasma arc reaction zone at a temperature of at least about 600° C.

2. The process of claim 1 wherein said carbon source is concurrently introduced with said sulfur dioxide into said zone in the form of particulate coal.

3. The process of claim 2 wherein the molar ratio of said sulfur dioxide to the carbon equivalent of said coal is from about 0.5 to 2.0.

4. The process of claim 3 wherein said ratio is about 1.0.

5. The process of claim 1 wherein the concentration of said sulfur dioxide in said gas stream is at least about 5 volume percent.

6. The process of claim 1 wherein said zone is generated by a rotating direct current arc.

* * * * *